US010756601B2

(12) United States Patent
Lee et al.

(10) Patent No.: US 10,756,601 B2
(45) Date of Patent: Aug. 25, 2020

(54) CONTROL METHOD AND CONTROL SYSTEM OF MOTOR ROTATION SPEED

(71) Applicants: Hyundai Motor Company, Seoul (KR); Kia Motors Corporation, Seoul (KR)

(72) Inventors: Dong Hun Lee, Gyeonggi-Do (KR); Sung Do Kim, Seoul (KR); Chang Seok You, Gyeonggi-do (KR); Min Su Kang, Gyeonggi-do (KR); Soon Il Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/055,112

(22) Filed: Aug. 5, 2018

(65) Prior Publication Data
US 2019/0288585 A1 Sep. 19, 2019

(30) Foreign Application Priority Data

Mar. 14, 2018 (KR) ........................ 10-2018-0029635

(51) Int. Cl.
*H02P 21/00* (2016.01)
*H02K 11/215* (2016.01)
*H02P 29/024* (2016.01)
*H02P 29/032* (2016.01)
*H02P 1/48* (2006.01)
*H02P 21/14* (2016.01)
*H02P 101/45* (2016.01)

(52) U.S. Cl.
CPC .............. *H02K 11/215* (2016.01); *H02P 1/48* (2013.01); *H02P 21/14* (2013.01); *H02P 29/0241* (2016.02); *H02P 29/032* (2016.02); *H02P 2101/45* (2015.01); *H02P 2203/09* (2013.01)

(58) Field of Classification Search
CPC .......................... H02K 11/215; H02P 29/0241
USPC ...................................... 318/400.02
See application file for complete search history.

(56) References Cited

U.S. PATENT DOCUMENTS

2007/0090782 A1* 4/2007 Endo ...................... B62D 5/046
                                                                                        318/432
2009/0140674 A1* 6/2009 Nakatsugawa ......... H02P 21/14
                                                                                        318/400.02
2014/0028224 A1* 1/2014 Arima ...................... H02P 21/24
                                                                                        318/400.02

(Continued)

FOREIGN PATENT DOCUMENTS

KR       2000-0074672       12/2000
KR       10-1755831 B1        7/2017

*Primary Examiner* — Erick D Glass
(74) *Attorney, Agent, or Firm* — Mintz Levin Cohn Ferris Glovsky and Popeo, P.C.; Peter F. Corless

(57) ABSTRACT

A control method of a motor rotation speed may include calculating a q-axis potential difference of a synchronous coordinate system for controlling a q-axis current of the synchronous coordinate system based on a target rotation speed of a motor and a measured rotation speed value of the speed sensor, calculating a voltage command of the synchronous coordinate system based on the calculated q-axis potential difference of the synchronous coordinate system, and controlling an inverter connected to the motor according to the calculated voltage command of the synchronous coordinate system.

15 Claims, 4 Drawing Sheets

(56) References Cited

U.S. PATENT DOCUMENTS

| | | | |
|---|---|---|---|
| 2014/0285125 A1* | 9/2014 | Kato | H02P 6/06 318/400.02 |
| 2015/0008853 A1* | 1/2015 | Yoo | H02P 1/265 318/400.04 |
| 2017/0141712 A1* | 5/2017 | Royak | H02M 7/53873 |
| 2019/0372497 A1* | 12/2019 | Gonschorek | H02P 21/0003 |

* cited by examiner

CONTROL METHOD AND CONTROL SYSTEM OF MOTOR ROTATION SPEED

CROSS REFERENCE TO RELATED APPLICATION

The present application claims under 35 U.S.C. § 119(a) the benefit of Korean Patent Application No. 10-2018-0029635 filed on Mar. 14, 2018, the entire contents of which are incorporated by reference herein.

BACKGROUND

(a) Technical Field

The present disclosure relates to a control method and a control system of motor rotation speed, and more particularly, to a technique capable of controlling a normal motor rotation speed without measuring a three-phase current of a motor.

(b) Description of the Related Art

Generally, a stator of a motor uses an electromagnetic field formed when a current flows into a three-phase coil, and a rotor uses permanent magnets, in which N and S poles are alternately repeatedly disposed. In order for the motor to be continuously rotated, formation of a continuous rotating magnetic field of the motor is required, and in order to form the continuous rotating magnetic field, rectification should be performed on each phase of a current flowing into an armature coil at an appropriate time and a position of the rotor should be accurately recognized for appropriate rectification. Here, the rectification changes a current direction of a stator coil of the motor to allow the rotor to be rotated.

Specifically, when a motor required for torque control, such as a drive motor in a hybrid vehicle, an electric vehicle (EV), or a fuel cell vehicle, is controlled, accurate measurement for a position of a rotor of the motor is necessary. That is, in order to control a three-phase current of the motor, a position sensor of the rotor of the motor and a three-phase current sensor for measuring the three-phase current of the motor are necessarily required.

FIG. 1 (RELATED ART) is a block diagram of a control system of a motor rotation speed according to the related art.

Referring to FIG. 1, in the control system of a motor rotation speed according to the related art, a motor 10 is controlled by an inverter 30, and the inverter 30 is controlled by a current controller 60. A speed controller 50 receives a speed command from a high-level controller 40 and provides a current command to the current controller 60, the current controller 60 provides a three-phase voltage command to the inverter 30, and the inverter 30 provides a three-phase current to the motor 10 according to the three-phase voltage.

A Hall sensor 20 is installed at the motor 10 to measure a speed of a motor rotor. The measured speed of the motor rotor measured may be used for feedback control in the speed controller 50.

Specifically, the current controller 60 may receive current commands $I_d^*$ and $I_q^*$ of a synchronous coordinate system from the speed controller 50 and transmit voltage commands $V_d^*$ and $V_q^*$ of the synchronous coordinate system to a coordinate converter 70, and the coordinate converter 70 may convert the voltage commands $V_d^*$ and $V_q^*$ of the synchronous coordinate system into a three-phase voltage command (a-phase, b-phase, and c-phase) and transmit the three-phase voltage command (a-phase, b-phase, and c-phase). The inverter 30 may provide a three-phase current to the motor 10 through a pulse width modulation (PWM) output duty of a three-phase switching circuit based on the received three-phase voltage command (a-phase, b-phase, and c-phase).

The current controller 60 may apply the voltage commands $V_d^*$ and $V_q^*$ to the inverter 30 to converge a measured value of a driving current, which is supplied from the inverter 30 to the motor 10, on the current commands $I_d^*$ and $I_q^*$. A three-phase current sensor 80 may be provided between the inverter 30 and the motor 10 to measure the driving current supplied from the inverter 30 to the motor 10. The three-phase current sensor 80 may measure two or more phases of a three-phase driving current and the measured two or more phases feed back to the current controller 60 via the coordinate converter 70. The current controller 60 may perform feedback control on measured values $I_d$ and $I_q$ of the measured driving current to converge the measured values $I_d$ and $I_q$ on the current commands $I_d^*$ and $I_q^*$ received from the speed controller 50.

The three-phase current sensor 80, which senses the three-phase current provided to the motor 10, generally senses two phases of the three-phase current, and in some cases, the three-phase current sensor 80 may sense one phase or all three phases.

However, when a three-phase current sensor fails in motor control in which the three-phase current sensor is necessarily required, there is a problem in that control of a motor rotational speed is impossible.

Further, when a motor used for a pump (e.g., a cooling water pump or an oil pump), a fan (e.g., a cooling fan or an air conditioning fan), an air compressor, and the like in which torque control is not necessary but only speed control is required, there is a problem in that a configuration of the three-phase current sensor is unnecessarily included.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a control method of a motor rotation speed without measuring a three-phase current when a three-phase current sensor fails or only a motor rotation speed is controlled.

According to one aspect, there is provided a control method of a motor rotation speed, which includes calculating, by a motor controller, a q-axis potential difference of a synchronous coordinate system for controlling a q-axis current of the synchronous coordinate system based on a target rotation speed of a motor and a measured rotation speed value of the motor; calculating, by the motor controller, a voltage command of the synchronous coordinate system based on the calculated q-axis potential difference of the synchronous coordinate system; and controlling, by the motor controller, an inverter connected to the motor according to the calculated voltage command of the synchronous coordinate system.

The calculating of the q-axis potential difference of the synchronous coordinate system may include calculating a difference between the target rotation speed and the measured rotation speed value and calculating the q-axis potential difference of the synchronous coordinate system using the calculated difference between the target rotation speed and the measured rotation speed value.

The calculating of the q-axis potential difference of the synchronous coordinate system may include integrating the calculated difference between the target rotation speed and the measured rotation speed value.

The control method may further include, after the calculating of the q-axis potential difference of the synchronous coordinate system, limiting a magnitude of the calculated q-axis potential difference of the synchronous coordinate system to a predetermined magnitude or less, wherein the calculating of the voltage command of the synchronous coordinate system may include calculating the voltage command of the synchronous coordinate system using the limited q-axis potential difference of the synchronous coordinate system.

When a previously calculated q-axis potential difference of the synchronous coordinate system is limited to the predetermined magnitude value or less, the calculating of the q-axis potential difference of the synchronous coordinate system may include performing anti-windup control for preventing a windup according to integration of the limited q-axis potential difference of the synchronous coordinate system and the previously calculated q-axis potential difference of the synchronous coordinate system.

The calculating of the voltage command of the synchronous coordinate system may include calculating the q-axis voltage command of the synchronous coordinate system by feedforward compensating for a counter electromotive force of the motor to the calculated q-axis potential difference of the synchronous coordinate system.

The counter electromotive force of the motor may be proportional to the measured rotation speed value with a counter electromotive force constant as a proportional constant.

The calculating of the voltage command of the synchronous coordinate system may include calculating a d-axis voltage command of the synchronous coordinate system using the q axis voltage command of the synchronous coordinate system, which is calculated by assuming that a d-axis current of the synchronous coordinate system is zero.

A d-axis voltage command of the synchronous coordinate system may be calculated using the following equation:

$$V_d = -L_q \omega_e \frac{V_q - \lambda \omega_e}{R_s}$$

wherein, $V_d$ is the d-axis voltage command of the synchronous coordinate system, $V_q$ is the q-axis voltage command of the synchronous coordinate system, $L_q$ is q-axis inductance of the synchronous coordinate system, $W_e$ is a measured rotation speed value (an electrical rotation speed), $R_s$ is phase resistance of the motor, and $\lambda$ is a counter electromotive force of the motor.

The controlling of the inverter may include performing coordinate conversion on the calculated voltage command of the synchronous coordinate system into a three-phase voltage command and controlling the inverter with the three-phase voltage command.

The control method may further include, before the calculating of the q-axis potential difference of the synchronous coordinate system, determining whether a three-phase current sensor for measuring a three-phase current applied from the inverter to the motor fails, wherein, when the three-phase current sensor is determined as failing, the calculating of the q-axis potential difference of the synchronous coordinate system may be performed.

According to another aspect, there is provided a control method of a synchronous coordinate system, which including calculating, by a motor controller, a voltage command of a synchronous coordinate system for controlling an inverter connected to a motor based on a target rotation speed of the motor and a measured rotation speed value of the motor; and controlling, by the motor controller, the inverter connected to the motor according to the calculated voltage command of the synchronous coordinate system.

According to still another aspect, there is provided a control system of a motor rotation speed, which including a speed sensor for measuring the motor rotation speed, and a motor controller configured to calculate a q-axis potential difference of a synchronous coordinate system for controlling a q-axis current of the synchronous coordinate system based on a target rotation speed of a motor and a measured rotation speed value of the speed sensor, calculate a voltage command of the synchronous coordinate system based on the calculated q-axis potential difference of the synchronous coordinate system, and control an inverter connected to the motor 100 according to the calculated voltage command of the synchronous coordinate system.

The control system may further include a coordinate converter configured to perform coordinate conversion on the calculated voltage command of the synchronous coordinate system into a three-phase voltage command and control the inverter with the three-phase voltage command.

The motor controller may limit a magnitude of the calculated voltage command of the synchronous coordinate system to a predetermined magnitude value or less and calculates the voltage command of the synchronous coordinate system using the limited q-axis potential difference of the synchronous coordinate system.

The motor controller may feedforward compensate for a counter electromotive force of the motor to the calculated q-axis potential difference of the synchronous coordinate system to calculate the q-axis voltage command of the synchronous coordinate system.

The motor controller may calculate a d-axis voltage command of the synchronous coordinate system using the q-axis voltage command of the synchronous coordinate system, which is calculated by assuming that a d-axis current of the synchronous coordinate system is zero.

The control system may further include a three-phase current sensor for measuring the three-phase current applied from the inverter to the motor, wherein the motor controller may determine whether the three-phase current sensor fails, and when the three-phase current sensor is determined as failing, the motor controller may calculate the q-axis electric potential difference of the synchronous coordinate system.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
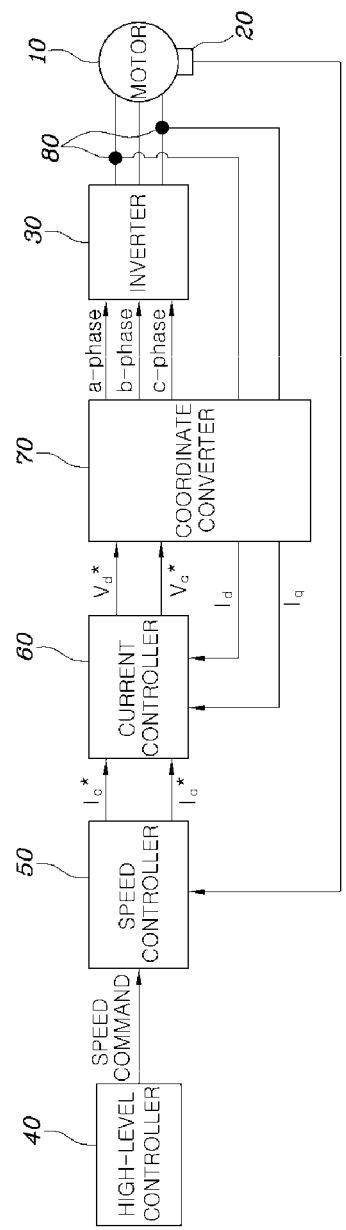
FIG. 1 (RELATED ART) is a block diagram of a control system of a motor rotation speed according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

Hereinafter, preferred embodiments of the present disclosure will be described in detail with reference to the accompanying drawings Like reference numerals denote like components throughout the drawings.

Figure 2:
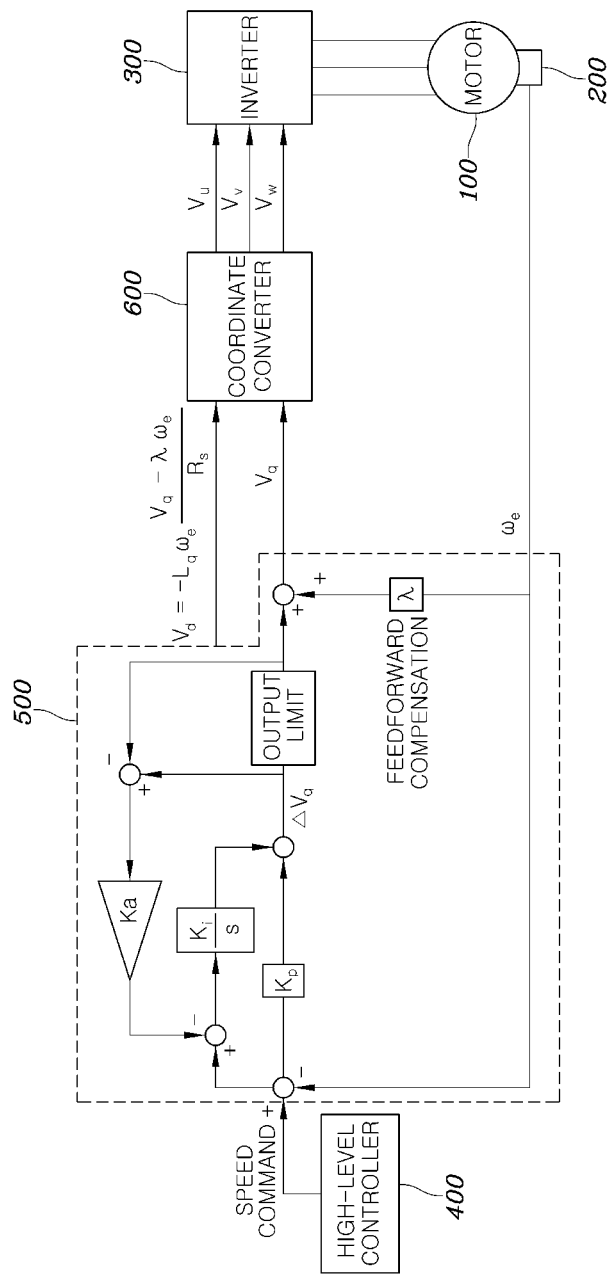
FIG. 2 is a block diagram of a control system of a motor rotation speed according to one embodiment of the present disclosure and a control flowchart of a motor controller.

FIG. 2 is a block diagram of a control system of a motor rotation speed according to one embodiment of the present disclosure and a control flowchart of a motor controller.

Referring to FIG. 2, the control system of a motor rotation speed according to one embodiment of the present disclosure includes a speed sensor 200 for measuring a rotation speed of a motor 100, and a motor controller 500 configured to calculate a q-axis potential difference of a synchronous coordinate system for controlling a q-axis current of the synchronous coordinate system based on a target rotation speed of the motor 100 and a measured speed value of the speed sensor 200, calculate a voltage command of the synchronous coordinate system based on the calculated q-axis potential difference of the synchronous coordinate system, and control an inverter 300 connected to the motor 100 according to the calculated voltage command of the synchronous coordinate system.

The control method of a motor rotation speed according to one embodiment of the present disclosure includes calculating a q-axis potential difference $\Delta V_q$ of a synchronous coordinate system for controlling a q-axis current of the synchronous coordinate system based on a target rotation speed of the motor 100 and a measured rotation speed value $W_e$ of the motor 100, calculating a voltage command of the synchronous coordinate system based on the calculated q-axis potential difference $\Delta V_q$ of the synchronous coordinate system, and controlling the inverter 300 connected to the motor 100 according to the calculated voltage command of the synchronous coordinate system.

Unlike the related art, the control method of a motor rotation speed or the control system of a motor rotation speed of the present disclosure has a configuration of directly calculating a voltage output for controlling the inverter 300 instead of a current output for controlling a torque. Thus, according to the present disclosure, a rotation speed of the motor 100 can be controlled without a three-phase current sensor for measuring a three-phase current applied to the motor 100. Accordingly, there is an effect of reducing a production cost of the three-phase current sensor.

The motor 100 of the present disclosure is a motor 100 having a permanent magnet therein, and specifically, the motor 100 of the present disclosure has a motor control system based on a rotation speed of the motor 100, and the motor 100 may be used for an air blower for supplying air to a fuel cell system, a cooling water pump, an oil pump, a cooling fan, an air conditioning fan, an air conditioner compressor, or the like.

The target rotation speed of the motor 100 may be determined by a high-level controller 400 and be transmitted to a motor controller 500 as a speed command. Alternatively, the target rotational speed of the motor 100 may be directly determined in the motor controller 500.

The speed sensor 200 may be a Hall sensor attached to the motor 100 and configured to measure a speed of the rotor. Further, the rotation speed of the motor 100 may be measured using another configuration such as a resolver.

A permanent magnet motor 100 may include a permanent magnet installed therein and a Hall sensor to measure a position and a speed of a rotating rotor. A resolver having superior accuracy may be used in an expensive drive system motor 100, but an inexpensive Hall sensor is installed at the motor 100 used for a general pump, a compressor, or a blower.

A digital signal receiving part for receiving a Hall sensor signal may generate an interrupt for exactly informing a central processing unit (CPU) of a time when the Hall sensor signal is varied. The CPU receives absolute time information (a computation time) via a clock. Recently, in a high-performance microcomputer unit (MCU), a CPU configured to perform various logic computations, a signal processing part, and a clock may be physically integrated as a single part.

Here, the measured rotation speed value $W_e$ may be a measured value of an electrical rotation speed of the motor 100. The electrical rotation speed of the motor 100 may be proportional to an actual rotation speed of the motor 100 according to the number of magnets constituting the rotor of the motor 100.

In the present disclosure, the q-axis potential difference $\Delta V_q$ of the synchronous coordinate system is a factor for controlling the q-axis current of the synchronous coordinate system. Specifically, the q-axis potential difference $\Delta V_q$ of the synchronous coordinate system is proportional to the q-axis current of the synchronous coordinate system, and a magnitude or a direction of the q-axis current of the synchronous coordinate system may be controlled according to a magnitude or a sign of the q-axis potential difference $\Delta V_q$ of the synchronous coordinate system.

Specifically, the q-axis potential difference $\Delta V_q$ of the synchronous coordinate system is a factor obtained by excluding a nonlinear term of a q-axis voltage $V_q$ of the synchronous coordinate system, and the factor is obtained by excluding a voltage component generated at a winding of the motor 100 according to a counter electromotive force $\lambda W_e$ of the motor 100. As described below, the q-axis voltage $V_q$ of the synchronous coordinate system may be calculated by adding the counter electromotive force $\lambda W_e$ of the motor 100 to the q-axis potential difference $\Delta V_q$ of the synchronous coordinate system.

The calculating of the q-axis potential difference $\Delta V_q$ of the synchronous coordinate system may include calculating a difference between the target rotation speed and the measured rotation speed value $W_e$ and calculating the q-axis potential difference $\Delta V_q$ of the synchronous coordinate system using the calculated difference between the target rotation speed and the measured rotation speed value $W_e$. That is, the difference between the measured rotation speed value $W_e$ and the target rotation which is the target rotation speed value of the motor 100 may be calculated, and then the q-axis potential difference $\Delta V_q$ of the synchronous coordinate system may be calculated so as to reduce the difference.

Specifically, the calculating of the q-axis potential difference $\Delta V_q$ of the synchronous coordinate system may include integrating the calculated difference between the target rotation speed and the measured rotation speed value $W_e$. As shown in FIG. 2, proportional integral (PI) control may be used. In addition to the PI control, various control methods such as integral proportional (IP) control, proportional integral derivation (PID) control, a PI/IP hybrid controller, and the like may be applied.

After the calculating of the q-axis potential difference $\Delta V_q$ of the synchronous coordinate system, a magnitude of the calculated q-axis potential difference $\Delta V_q$ of the synchronous coordinate system may be limited to a predetermined magnitude value or less, and the calculating of the voltage command of the synchronous coordinate system may include calculating the voltage command of the synchronous coordinate system using the limited q-axis potential difference $\Delta V_q$ of the synchronous coordinate system.

In the present disclosure, the three-phase current sensor is omitted and thus feedback control of the three-phase current is impossible. In order to prevent an overcurrent phenomenon of the three-phase current, magnitudes (maximum and minimum) of the q-axis potential difference $\Delta V_q$ of the synchronous coordinate system, which are outputs of the motor controller 500, may be limited.

The predetermined magnitude value for limiting the q-axis potential difference $\Delta V_q$ of the synchronous coordinate system may theoretically be calculated and applied so as not to exceed a maximum allowable q-axis current value of the synchronous coordinate system. Alternatively, maximum and minimum values of the q-axis potential difference $\Delta V_q$ of the synchronous coordinate system, which do not exceed the maximum allowable q-axis current value of the synchronous coordinate system which is acceptable in design through a driving evaluation test, may be determined and applied.

Further, in consideration of errors caused by characteristics of motor design factors such as phase resistance, inductance, a counter electromotive force, a switching device, and the like, the maximum and minimum values of the q-axis potential difference $\Delta V_q$ of the synchronous coordinate system may be set to as values which are varied according to a speed. Magnitudes of the maximum and minimum values of the q-axis potential difference $\Delta V_q$ of the synchronous coordinate system may be set to be different from each other. Accordingly, the q-axis current of the synchronous coordinate system may be limited to an allowable value, such that there is an effect in that the overcurrent phenomenon in the three-phase current of the motor 100 can be prevented.

When the overcurrent phenomenon occurs in the three-phase current of the motor 100, there may occur problems in that a three-phase high-speed switching device at the inverter 300 is burned, a winding in a three-phase cable motor 100 is overheated, and a rotating magnetic field of the motor 100 is formed to be large to cause demagnetization of the permanent magnet.

When a previously calculated q-axis potential difference $\Delta V_q$ of the synchronous coordinate system is limited to a predetermined magnitude value or less, the calculating of the q-axis potential difference $\Delta V_q$ of the synchronous coordinate system may include performing anti-windup control for preventing a windup according to integration of the limited q-axis potential difference $\Delta V_q$ of the synchronous coordinate system and the previously calculated q-axis potential difference $\Delta V_q$ of the synchronous coordinate system. That is, a difference between the limited q-axis potential difference $\Delta V_q$ of the synchronous coordinate system to the predetermined magnitude value and the previously calculated q-axis potential difference $\Delta V_q$ of the synchronous coordinate system are compensated for, such that unnecessary integration may be prevented, and the windup may be blocked.

When the q-axis potential difference $\Delta V_q$ of the synchronous coordinate system is limited, a difference occurs between the calculated q-axis potential difference $\Delta V_q$ of the synchronous coordinate system and the limited q-axis potential difference $\Delta V_q$ of the synchronous coordinate system. Accordingly, this difference is subsequently compensated for during the calculating of the q-axis potential difference $\Delta V_q$ of the synchronous coordinate system.

Specifically, when the calculating of the q-axis potential difference $\Delta V_q$ of the synchronous coordinate system includes the integrating of the calculated difference between the target rotation speed and the measured rotation speed value $W_e$, the difference between the calculated q-axis potential difference $\Delta V_q$ of the synchronous coordinate system and the limited q-axis potential difference $\Delta V_q$ of the synchronous coordinate system is continuously integrated such that a windup phenomenon may occur.

Therefore, in order to perform the anti-windup control, a difference between the previously calculated q-axis potential difference $\Delta V_q$ of the synchronous coordinate system and the predetermined magnitude value may be compensated for during the integrating of the calculated difference between the target rotation speed and the measured rotation speed value $W_e$.

The calculating of the voltage command of the synchronous coordinate system may include feedforward compensating for the counter electromotive force of the motor 100 to the calculated q-axis potential difference $\Delta V_q$ of the synchronous coordinate system and calculating a q-axis voltage command of the synchronous coordinate system. That is, the q-axis voltage command of the synchronous coordinate system may be calculated by compensating for the counter electromotive force of the motor 100 to the q-axis potential difference $\Delta V_q$ of the synchronous coordinate system.

Here, the counter electromotive force of the motor 100 may be proportional to the measured rotation speed value $W_e$ with a counter electromotive force constant $\lambda$ as a proportional constant.

During the calculating of the q-axis voltage command of the synchronous coordinate system, the feedforward compensating for the counter electromotive force of the motor 100 to the q-axis potential difference $\Delta V_q$ of the synchronous coordinate system is performed, and the q-axis voltage command of the synchronous coordinate system is controlled the magnitude of the q-axis potential difference $\Delta V_q$ of the synchronous coordinate system, which is the output value of the motor controller 500. As an absolute value of the q-axis potential difference $\Delta V_q$ of the synchronous coordinate system becomes larger, the magnitude of the q-axis current of the synchronous coordinate system increases, and when the q-axis potential difference $\Delta V_q$ of the synchronous coordinate system is a positive value, the q-axis current of the synchronous coordinate system is generated as a positive value (motoring), and when the q-axis potential difference $\Delta V_q$ of the synchronous coordinate system is a negative value, the q-axis current of the synchronous coordinate system is generated as a negative value (regenerative braking), such that a direction of a torque may be controllable.

Since only a q-axis potential difference $\Delta V_q$ of the synchronous coordinate system, which is a linear term, between the q-axis voltage $V_q$ of the synchronous coordinate system and the q-axis current of the synchronous coordinate system is controlled, there is an effect in that control can stably be performed through a PI controller.

Further, when the q-axis voltage $V_q$ of the synchronous coordinate system is designed to be directly output without feedforward compensating for a nonlinear term between the q-axis voltage $V_q$ of the synchronous coordinate system and the q-axis current of the synchronous coordinate system, since a voltage component generated at the winding according to the counter electromotive force and the three-phase current is not considered, control of the motor 100 may be possible at a low speed, but even though proportional control and integral control are well designed in a high speed state in which influence of the nonlinear term increases, control of the three-phase current of the motor 100 may be impossible and thus a rotation speed of the motor 100 may not be controllable normally.

The calculating of the voltage command of the synchronous coordinate system may include calculating a d-axis voltage command of the synchronous coordinate system using the q axis voltage command of the synchronous coordinate system, which is calculated by assuming that a d-axis current of the synchronous coordinate system is zero.

Specifically, the calculating of the voltage command of the synchronous coordinate system may calculate the q-axis voltage command of the synchronous coordinate system and the d-axis voltage command of the synchronous coordinate system using the following equations.

$$V_d = R_s I_d + L_d \frac{dI_d}{dt} - L_q \omega_e I_q$$

Here, $V_q$ is the q-axis voltage command of the synchronous coordinate system, $V_d$ is the d-axis voltage command of the synchronous coordinate system, $I_q$ is the q-axis current of the synchronous coordinate system, $I_d$ is a d-axis current of the synchronous coordinate system, $R_s$ is phase resistance of the motor 100, $W_e$ is the rotation speed (electrical rotation speed) of the motor 100, $L_d$ is d-axis inductance of the synchronous coordinate system, $L_q$ is q-axis inductance of the synchronous coordinate system, and $\lambda$ is the counter electromotive force of the motor 100.

Since equivalent torque control is performed on the motor 100 of the present disclosure to a maximum speed (field weakening control is not performed) and a current is applied in only a q-axis direction of the synchronous coordinate system to control the rotation speed of the motor 100, a current of 0 A is applied as the d-axis current Id of the synchronous coordinate system. Further, the above-described equation may be simplified as the following equation by assuming that a current differential term having a small degree of influence is zero.

$$V_d = -L_q \omega_e I_q$$

In the above-described equation, the q-axis current of the synchronous coordinate system may be expressed as an equation for the q-axis voltage command of the synchronous coordinate system, and the d-axis voltage command of the synchronous coordinate system may be calculated using the following equation in which the equation for the q-axis voltage command of the synchronous coordinate system is summarized as an equation for the d-axis voltage command of the synchronous coordinate system.

Here, $V_d$ is the d-axis voltage command of the synchronous coordinate system, $V_q$ is the q-axis voltage command of the synchronous coordinate system, $L_q$ is the q-axis inductance of the synchronous coordinate system, $W_e$ is a measured rotation speed value (the electrical rotation speed), $R_s$ is the phase resistance of the motor 100, and $\lambda$ is the counter electromotive force of the motor 100.

A coordinate converter 600 may further be included to perform a coordinate conversion on the voltage command of the synchronous coordinate system calculated by the motor controller 500 into a three-phase voltage command and control the inverter 300 with the three-phase voltage command.

The controlling of the inverter 300 may include performing a coordinate conversion on the voltage command of the synchronous coordinate system calculated by the coordinate converter 600 into the three-phase voltage command and controlling the inverter 300 with the three-phase voltage command.

Like the related art, a coordinate conversion may be performed on the calculated d-axis voltage command of the synchronous coordinate system and the q-axis voltage command of the synchronous coordinate system to calculate the three-phase voltage command, and then various voltage modulation methods may be applied to the three-phase voltage command to calculate a PWM output duty of a final three-phase (U, V, and W). This is a well-known technique, and thus a detailed description thereof will be omitted.

Figure 3:
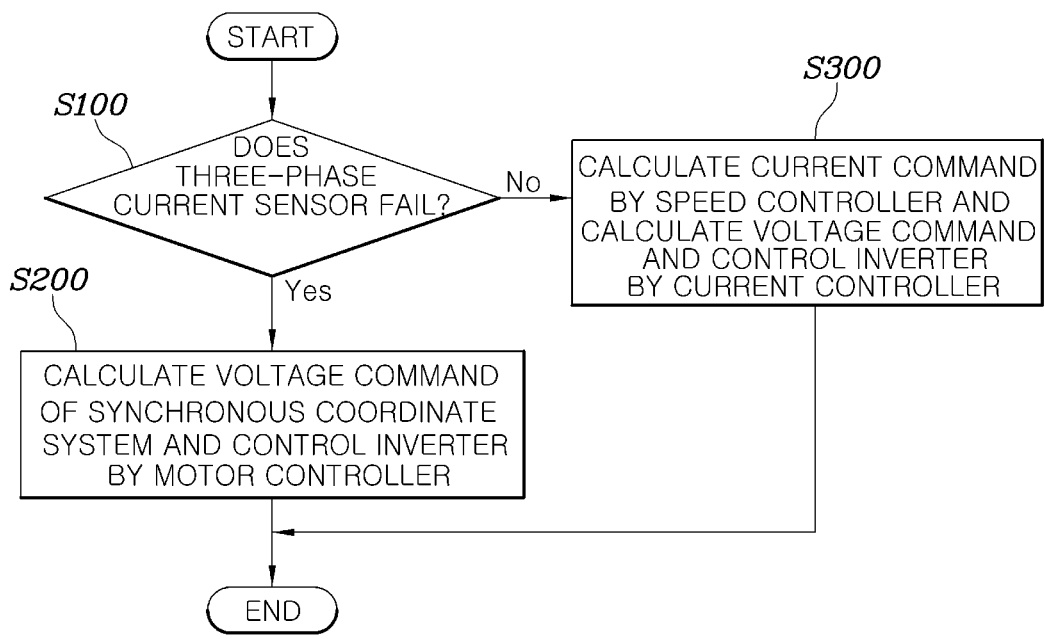
FIG. 3 is a flowchart of a control method of a motor rotation speed according to one embodiment of the present disclosure.

FIG. 3 is a flowchart of a control method of a motor rotation speed according to one embodiment of the present disclosure.

Referring to FIG. 3, the control method of a motor rotation speed according to one embodiment of the present disclosure may further include, before the calculating of the q-axis potential difference $\Delta V_q$ of the synchronous coordinate system, determining whether a three-phase current sensor for measuring a three-phase current applied from the inverter 300 to the motor 100 fails (S100), and when the three-phase current sensor is determined as failing, calculating a q-axis potential difference $\Delta V_q$ of the synchronous coordinate system (S200).

Like the related art, the control system of a motor rotation speed may further include the three-phase current sensor (not shown) for measuring the three-phase current applied from the inverter 300 to the motor 100, and the motor controller 500 may determine whether the three-phase current sensor fails, and when the three-phase current sensor is determined as failing, the motor controller 500 may calculate the q-axis potential difference $\Delta V_q$ of the synchronous coordinate system.

That is, even though the control system of a motor rotation speed includes the three-phase current sensor (not shown) and controls the rotation speed of the motor 100 as in the related art, when the three-phase current sensor (not shown) is determined as failing (S100), the control method of a motor rotation speed may be applied to calculate the voltage command of the synchronous coordinate system for controlling the inverter 300 connected to the motor 100 based on the target rotation speed of the motor 100 and the measured rotation speed value of the 100 and control the inverter 300 connected to the motor 100 according to the calculated voltage command of the synchronous coordinate system (S200).

On the other hand, when the three-phase current sensor (not shown) is determined as not failing in the same control system of a motor rotation speed, like the related art, the speed controller 50 may calculate the current command and feed back the current command and the three-phase current value measured at the three-phase current sensor (not shown) to control the inverter 300 connected to the motor 100 (S300).

Here, in the determining whether the three-phase current sensor (not shown) fails, the failure of the three-phase current sensor (not shown) may include all abnormalities therein such as a short circuit, disconnection, consistency, and the like, and whether the three-phase current sensor (not shown) fails may be determined through a variation or a magnitude of the three-phase current value sensed by the three-phase current sensor (not shown).

Accordingly, the control system of a motor rotation speed employing the three-phase current sensor resolves a problem in that, when the three-phase current sensor fails, control of the three-phase current of the inverter is conventionally impossible and thus a motor cannot be driven, such that there are effects in that an emergency operation can be possible even though the three-phase current sensor fails, and stability and robustness of the control system of the motor rotation speed can be improved.

The control method of a motor rotational speed of the present disclosure calculates the voltage command of the synchronous coordinate system for controlling the inverter 300 connected to the motor 100 based on the target rotation speed of the motor 100 and the measured rotation speed value of the motor 100 and controls the inverter 300 connected to the motor 100 according to the calculated voltage command of the synchronous coordinate system.

Figure 4:
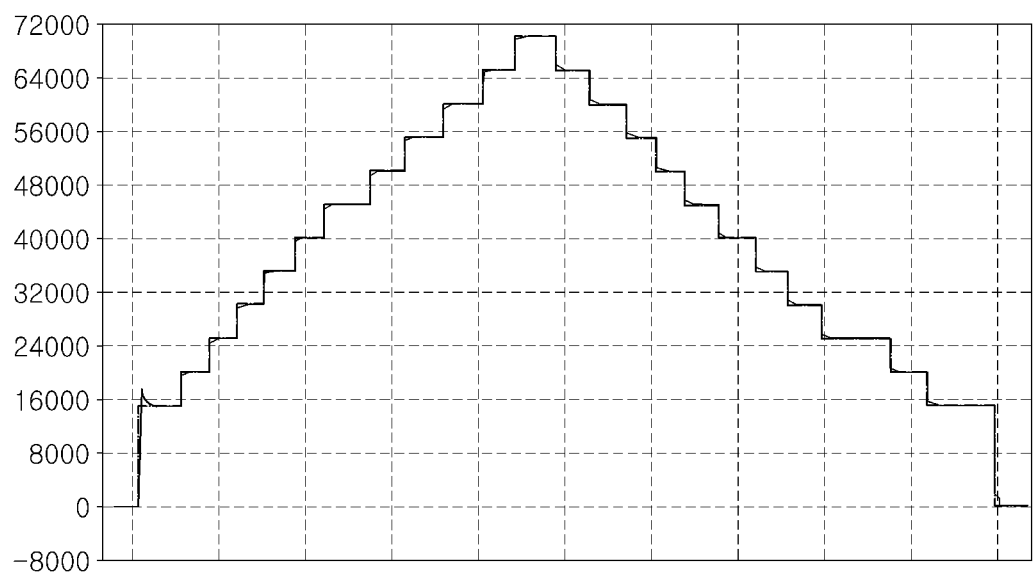
FIG. 4 is a diagram illustrating data for which the control method of a motor rotation speed or the control system of a motor rotation speed of the present disclosure is applied to an air compressor of a fuel cell vehicle.

FIG. 4 is a diagram illustrating data for which the control method of a motor rotation speed or the control system of a motor rotation speed of the present disclosure is applied to an air compressor of a fuel cell vehicle.

Referring to FIG. 4, even though the control system of a motor rotation speed, in which the three-phase current sensor is omitted, and the control method of a motor rotation speed according to the present disclosure are applied, it can be seen that the motor rotation speed is accelerated to about 70,000 revolutions per minute (rpm) and, even when the motor rotation speed is decelerated again, the measured motor rotation speed value correctly converges on the speed command.

Specifically, it can be seen that, even in a section in which the motor 100 is driven at a constant speed, an error between the speed command and the measured rotation speed value is less than 10 rpm, and thus the error is very small and the performance converging on the speed command is superior.

In accordance with the control method and the control system of a motor rotational speed of the present disclosure, the three-phase current sensor for measuring the three-phase current is omitted from the motor control system based on the speed control, such that there is an effect in that a production cost can be reduced.

Further, in the case of a motor control system including a three-phase current sensor with torque control, when the three-phase current sensor fails, the control method and the control system of a motor rotational speed of the present disclosure is applied to allow emergency control of the motor such that there is an effect in that stability and robustness of control can be improved.

Although specific embodiments of the present disclosure have been described and illustrated, those skilled in the art will appreciate that various alternations and modifications are possible without departing from the technical spirit of the present disclosure as disclosed in the appended claims.

What is claimed is:

1. A control method of a motor rotation speed, comprising:
   calculating, by a motor controller, a q-axis potential difference of a synchronous coordinate system for controlling a q-axis current of the synchronous coordinate system based on a target rotation speed of a motor and a measured rotation speed value of the motor;
   calculating, by the motor controller, a voltage command of the synchronous coordinate system based on the calculated q-axis potential difference of the synchronous coordinate system; and
   controlling, by the motor controller, an inverter connected to the motor according to the calculated voltage command of the synchronous coordinate system,
   wherein calculating the voltage command of the synchronous coordinate system includes calculating a q-axis voltage command of the synchronous coordinate system by feedforward compensating for a counter electromotive force of the motor to the calculated q-axis potential difference of the synchronous coordinate system.

2. The control method of claim 1, wherein calculating the q-axis potential difference of the synchronous coordinate system includes calculating a difference between the target rotation speed and the measured rotation speed value and calculating the q-axis potential difference of the synchronous coordinate system using the calculated difference between the target rotation speed and the measured rotation speed value.

3. The control method of claim 2, wherein calculating the q-axis potential difference of the synchronous coordinate system includes integrating the calculated difference between the target rotation speed and the measured rotation speed value.

4. The control method of claim 1, further comprising:
after calculating the q-axis potential difference of the synchronous coordinate system, limiting a magnitude of the calculated q-axis potential difference of the synchronous coordinate system to a predetermined magnitude or less,
wherein calculating the voltage command of the synchronous coordinate system includes calculating the voltage command of the synchronous coordinate system using the limited q-axis potential difference of the synchronous coordinate system.

5. The control method of claim 4, wherein, when a previously calculated q-axis potential difference of the synchronous coordinate system is limited to the predetermined magnitude value or less, calculating the q-axis potential difference of the synchronous coordinate system includes performing anti-windup control for preventing a windup according to integration of the limited q-axis potential difference of the synchronous coordinate system and the previously calculated q-axis potential difference of the synchronous coordinate system.

6. The control method of claim 1, wherein the counter electromotive force of the motor is proportional to the measured rotation speed value with a counter electromotive force constant as a proportional constant.

7. The control method of claim 1, wherein calculating the voltage command of the synchronous coordinate system includes calculating a d-axis voltage command of the synchronous coordinate system using the q axis voltage command of the synchronous coordinate system, which is calculated by assuming that a d-axis current of the synchronous coordinate system is zero.

8. The control method of claim 7, wherein a d-axis voltage command of the synchronous coordinate system is calculated using the following equation:

$$V_d = -L_q \omega_e \frac{V_q - \lambda \omega_e}{R_s}$$

wherein, $V_d$ is the d-axis voltage command of the synchronous coordinate system, $V_q$ is the q-axis voltage command of the synchronous coordinate system, $L_q$ is q-axis inductance of the synchronous coordinate system, $W_e$ is a measured rotation speed value (an electrical rotation speed), $R_s$ is phase resistance of the motor, and $\lambda$ is a counter electromotive force of the motor.

9. The control method of claim 1, wherein controlling the inverter includes performing coordinate conversion on the calculated voltage command of the synchronous coordinate system into a three-phase voltage command and controlling the inverter with the three-phase voltage command.

10. The control method of claim 1, further comprising:
before calculating the q-axis potential difference of the synchronous coordinate system, determining whether a three-phase current sensor for measuring a three-phase current applied from the inverter to the motor fails,
wherein, when the three-phase current sensor is determined as failing, calculating the q-axis potential difference of the synchronous coordinate system is performed.

11. A control system of a motor rotation speed, comprising:
a speed sensor for measuring the motor rotation speed; and
a motor controller configured to calculate a q-axis potential difference of a synchronous coordinate system for controlling a q-axis current of the synchronous coordinate system based on a target rotation speed of a motor and a measured rotation speed value of the speed sensor, calculate a voltage command of the synchronous coordinate system based on the calculated q-axis potential difference of the synchronous coordinate system, and control an inverter connected to the motor according to the calculated voltage command of the synchronous coordinate system,
wherein the motor controller feedforward compensates for a counter electromotive force of the motor to the calculated q-axis potential difference of the synchronous coordinate system to calculate a q-axis voltage command of the synchronous coordinate system.

12. The control system of claim 11, further comprising:
a coordinate converter configured to perform coordinate conversion on the calculated voltage command of the synchronous coordinate system into a three-phase voltage command and control the inverter with the three-phase voltage command.

13. The control system of claim 11, wherein the motor controller limits a magnitude of the calculated voltage command of the synchronous coordinate system to a predetermined magnitude value or less and calculates the voltage command of the synchronous coordinate system using the limited q-axis potential difference of the synchronous coordinate system.

14. The control system of claim 11, wherein the motor controller calculates a d-axis voltage command of the synchronous coordinate system using the q-axis voltage command of the synchronous coordinate system, which is calculated by assuming that a d-axis current of the synchronous coordinate system is zero.

15. The control system of claim 11, further comprising:
a three-phase current sensor for measuring the three-phase current applied from the inverter to the motor,
wherein the motor controller determines whether the three-phase current sensor fails, and when the three-phase current sensor is determined as failing, the motor controller calculates the q-axis electric potential difference of the synchronous coordinate system.

* * * * *